United States Patent
Hanson et al.

(10) Patent No.: US 7,119,981 B2
(45) Date of Patent: Oct. 10, 2006

(54) METHOD AND APPARATUS FOR TRACKING RADIALLY-DEPENDENT REPEATABLE RUN-OUT

(75) Inventors: Reed D. Hanson, Chaska, MN (US); Nathaniel B. Wilson, Edmond, OK (US); John C. Morris, Minneapolis, MN (US); Timothy F. Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 432 days.

(21) Appl. No.: 10/184,702

(22) Filed: Jun. 28, 2002

(65) Prior Publication Data

US 2003/0112546 A1    Jun. 19, 2003

Related U.S. Application Data

(60) Provisional application No. 60/342,072, filed on Dec. 18, 2001.

(51) Int. Cl.
*G11B 5/596* (2006.01)
*G11B 5/55* (2006.01)

(52) U.S. Cl. .................... 360/77.04; 360/78.04

(58) Field of Classification Search ........... 360/77.04, 360/75, 77.02, 77.08, 78.04, 78.07, 78.09, 360/78.14
See application file for complete search history.

(56) References Cited

U.S. PATENT DOCUMENTS

| | | | |
|---|---|---|---|
| 4,087,842 A | 5/1978 | Manly | |
| 5,550,685 A | 8/1996 | Drouin | |
| 5,585,976 A | 12/1996 | Pham | 360/77.04 |
| 5,617,388 A | 4/1997 | Ishioka et al. | |
| 5,825,578 A | 10/1998 | Shrinkle et al. | |
| 5,886,846 A | 3/1999 | Pham et al. | 360/78.04 |
| 5,978,169 A | 11/1999 | Woods | |
| 5,995,316 A | 11/1999 | Stich | 360/77.04 |
| 6,031,683 A * | 2/2000 | Iverson et al. | 360/78.04 |
| 6,061,200 A | 5/2000 | Shepherd et al. | |
| 6,141,175 A | 10/2000 | Nazarian et al. | |
| 6,310,742 B1 | 10/2001 | Nazarian et al. | |
| 6,377,417 B1 | 4/2002 | Ahn | 360/77.04 |
| 6,532,129 B1 * | 3/2003 | Sri-Jayantha et al. | 360/77.02 |
| 6,587,302 B1 * | 7/2003 | Ahn | 360/77.04 |
| 6,707,635 B1 * | 3/2004 | Codilian et al. | 360/77.04 |
| 6,765,747 B1 * | 7/2004 | Sun et al. | 360/77.04 |
| 6,859,341 B1 * | 2/2005 | Min et al. | 360/77.04 |
| 6,867,943 B1 * | 3/2005 | Harmer et al. | 360/77.04 |

OTHER PUBLICATIONS

Hsin et. al., "Written-In Repeatable Run-Out Compensation in Embedded Servo Disc Drives," Jun. 28, 2002.

(Continued)

Primary Examiner—Hoa T. Nguyen
Assistant Examiner—James L. Habermehl
(74) Attorney, Agent, or Firm—Westman, Champlin & Kelly (57) ABSTRACT

An apparatus and method for tracking radially-dependent repeatable run-out in a disc drive having a servo loop for positioning a head over a rotating disc is provided. The disc includes multiple tracks. Radially-dependent repeatable run-out control components for at least a subset of the multiple tracks are first determined. Data representative of the radially-dependent repeatable run-out control components for the subset of the multiple tracks is then stored. The stored data representative of the radially-dependent repeatable run-out control components is retrieved before settling on the target track, and subsequently used to follow the selected track.

9 Claims, 12 Drawing Sheets

OTHER PUBLICATIONS

Morris et al., "Compression and Storage of Written-In Error Compensation Tables in an Embedded Servo Disc Drive," Feb. 12, 2001.

Zhang et al., "Real-Time Automatic Loop-Sharing for a Disc Drive Servo Control System," Jun. 29, 2001.

* cited by examiner

METHOD AND APPARATUS FOR TRACKING RADIALLY-DEPENDENT REPEATABLE RUN-OUT

CROSS-REFERENCE TO RELATED APPLICATION

This application claims priority from U.S. Provisional Application No. 60/342,072 filed on Dec. 18, 2001 for inventors Reed D. Hanson, Nathaniel B. Wilson, John C. Morris and Timothy F. Ellis and entitled "ALGORITHM TO TRACK RADIALLY-DEPENDENT REPEATABLE RUNOUT."

FIELD OF THE INVENTION

The present invention relates generally to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo sub-system to position a head over a particular track. In current disc drives, the servo fields are written onto the disc in-situ (i.e., after the disc is mounted on the spindle motor of a disc drive) when the disc drive is manufactured and are thereafter simply read by the disc drive to determine position.

Ideally, a head following the center of a track moves along a perfectly circular path around the disc. However, various types of errors prevent heads from following this ideal path. One type of error is a written-in error that arises during creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path. Written-in errors are often referred to as repeatable run-out (RRO) errors or written-in repeatable run-out (WI-RRO) errors because they cause the same errors each time the head passes along a track. In drives employing in-situ-written discs, the RRO or WI-RRO phenomenon is typically not radially-dependent, i.e., there is no definite correlation between the radial position of a track between the disc inner diameter (ID) and the disc outer diameter (OD) on the disc surface and the WI-RRO associated with the track.

To meet the demand for greater recording density in disc drives, servo-track writing is undergoing a fundamental change. In the near future, manufactured disc drives will include discs with servo-tracks that are pre-written onto the discs before the discs are mounted on the spindle motor of the drive. Tests have shown that when such discs with pre-written tracks (pre-written discs) are mounted and clamped on a spindle motor of a disc drive, in addition to WI-RRO errors, RRO errors also occur due to centering misalignment of the pre-written servo tracks and the center of rotation of the spindle, and further due to track distortion caused by disc clamping forces. This additional RRO induced in drives including pre-written discs has been found to be radially-dependent, i.e., this additional RRO varies coherently across the surface of the disc from the OD to the inner ID.

Current servo tracking systems, which are utilized with in-situ-written discs described above, are designed for tracking WI-RRO and are not suitable for tracking radially-dependent repeatable run-out (RD-RRO). Thus, when such servo systems are employed for head position control in drives with pre-written discs, the settle time required for the head before it can properly follow a destination or target track at the end of a seek operation is relatively large. This large settle time, which is due to the slow adaptation of the servo system to the RD-RRO, negatively impacts the performance of the disc drive.

Embodiments of the present invention provide solutions to these and other problems, and offer other advantages over the prior art.

SUMMARY OF THE INVENTION

The present embodiments relate to disc drive servo systems that employ a radially-dependent repeatable run-out tracking scheme to track radially-dependent repeatable run-out in the servo system, thereby addressing the above-mentioned problems.

An apparatus and method for tracking radially-dependent repeatable run-out in a disc drive having a servo loop for positioning a head over a rotating disc is provided. The disc includes multiple tracks. Radially-dependent repeatable run-out control components for at least a subset of the multiple tracks are first determined. Data representative of the radially-dependent repeatable run-out control components for the subset of the multiple tracks is then stored. The stored data representative of the radially-dependent repeatable run-out control components is utilized to follow different tracks of the multiple tracks.

Other features and benefits that characterize embodiments of the present invention will be apparent upon reading the following detailed description and review of the associated drawings.

BRIEF DESCRIPTION OF THE DRAWINGS

FIG. 3-1 is a block diagram of a servo loop.

FIG. 3-2 is an RRO spectrum measured for a drive with in-situ-written discs and employing a RRO tracking scheme.

FIG. 3-3 is an RRO spectrum measured for a drive with pre-written discs and employing a RRO tracking scheme.

FIG. 4-1 is a block diagram of a servo loop of an embodiment of the present invention.

FIG. 4-2 is an RRO spectrum measured for a drive with pre-written discs and employing an RRO compensation module of the present invention.

FIGS. 5-1 through 5-4 are plots representing RRO component values for different tracks.

DETAILED DESCRIPTION OF ILLUSTRATIVE EMBODIMENTS

Figure 1:
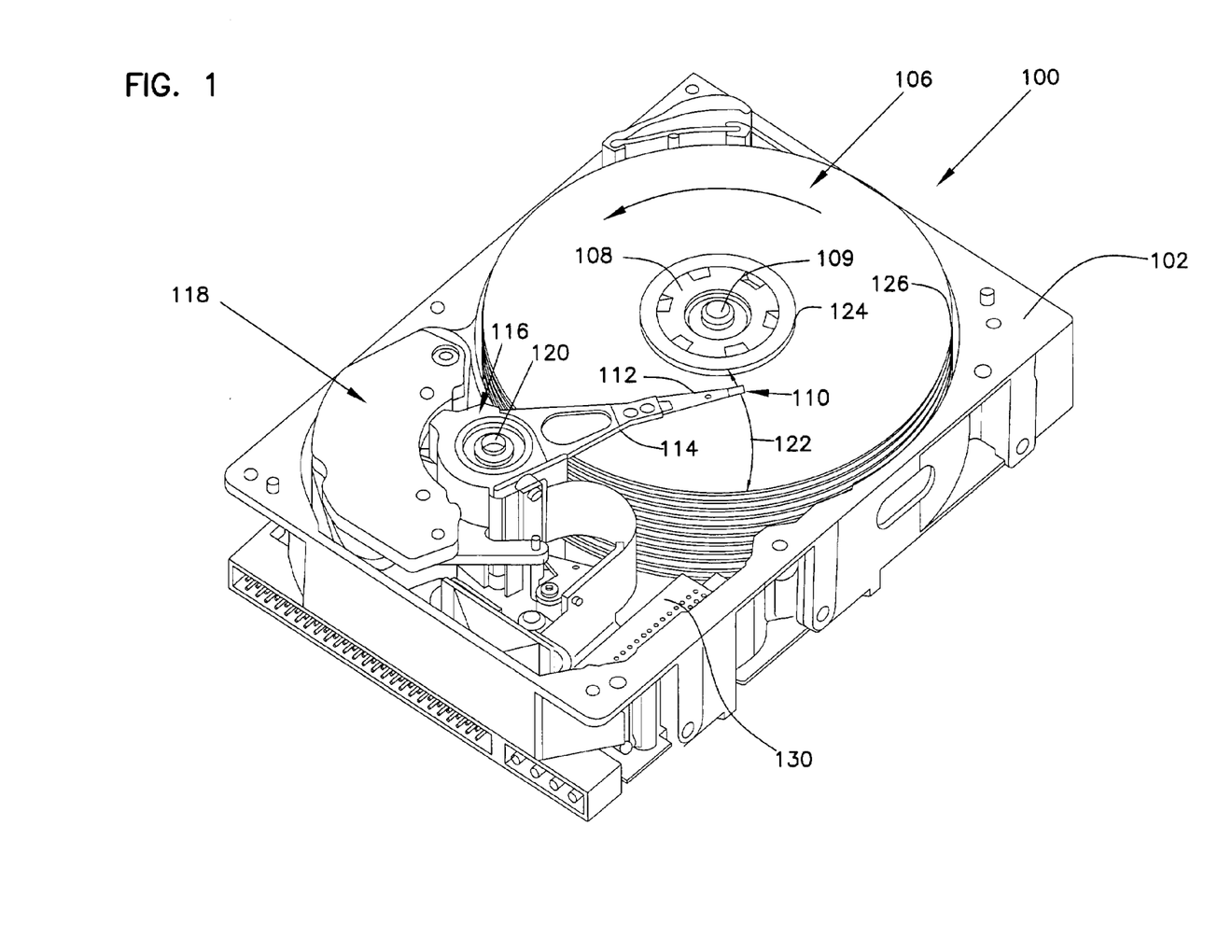
FIG. 1 is an isometric view of a disc drive.

Referring now to FIG. 1, an isometric view of a disc drive 100 in which embodiments of the present invention are useful is shown. The same reference numerals are used in various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
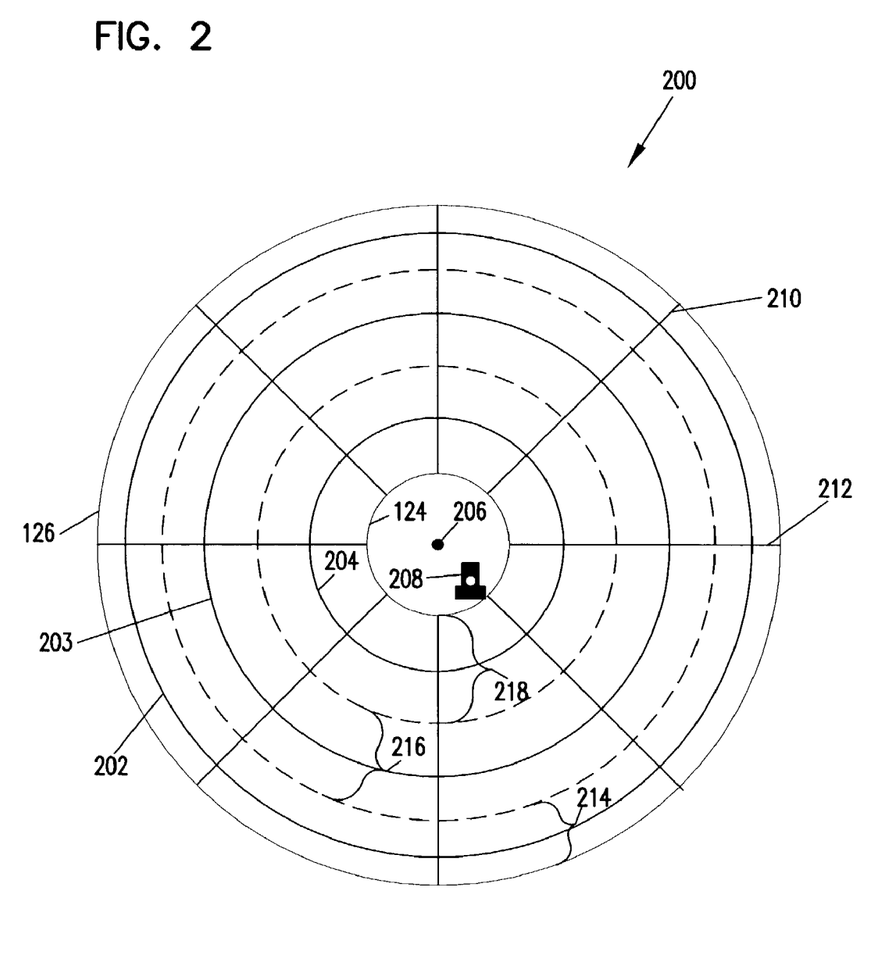
FIG. 2 is a top view of a section of a disc with pre-written servo tracks.

Referring now to FIG. 2, a top view of a section 200 of a disc, with pre-written servo-tracks such as 202, 203 and 204, which is mounted on a disc drive spindle motor having a spin-axis 208 is shown. Disc 200 includes a plurality of radially extending servo fields such as servo fields 210 and 212 which define a plurality of servo sectors. Disc 200 may also be divided into zones, with each zone including multiple tracks. In FIG. 2, three zones 214, 216 and 218 are shown. Pre-written servo tracks 202, 203 and 204 have an actual track center shown by reference numeral 206. If the track center of the disc coincides with the center of the spindle motor and if the tracks are perfectly circular, there will be no repeated position errors or RRO errors occurring each time the head passes a particular circumferential location on the disc. However, since the tracks are never perfectly circular, WI-RRO always occurs in drives. Further, as can be seen in FIG. 2, in a drive with a pre-written disc such as 200, an incongruity between the track center 206 and the spindle motor spin-axis 208 typically exists. Additionally, in such drives with pre-written discs, servo-track distortion occurs when the disc is clamped onto the spindle motor. The centering misalignment of the pre-written servo tracks such as 202, 203 and 204 as well as servo track distortion due disc clamping forces contributes significantly to the RRO phenomenon. The RRO caused by centering misalignment and clamping forces has been found to be radially-dependent and thus varies coherently across the surface of the disc from the OD to the ID.

Under the present invention, an RD-RRO tracking scheme is employed to track RD-RRO in a disc drive. Here, the tracking of RD-RRO is carried out by determining RD-RRO control components for the servo tracks and storing data representing these RD-RRO control components. This stored data is utilized to follow the servo tracks.

Figure 31:
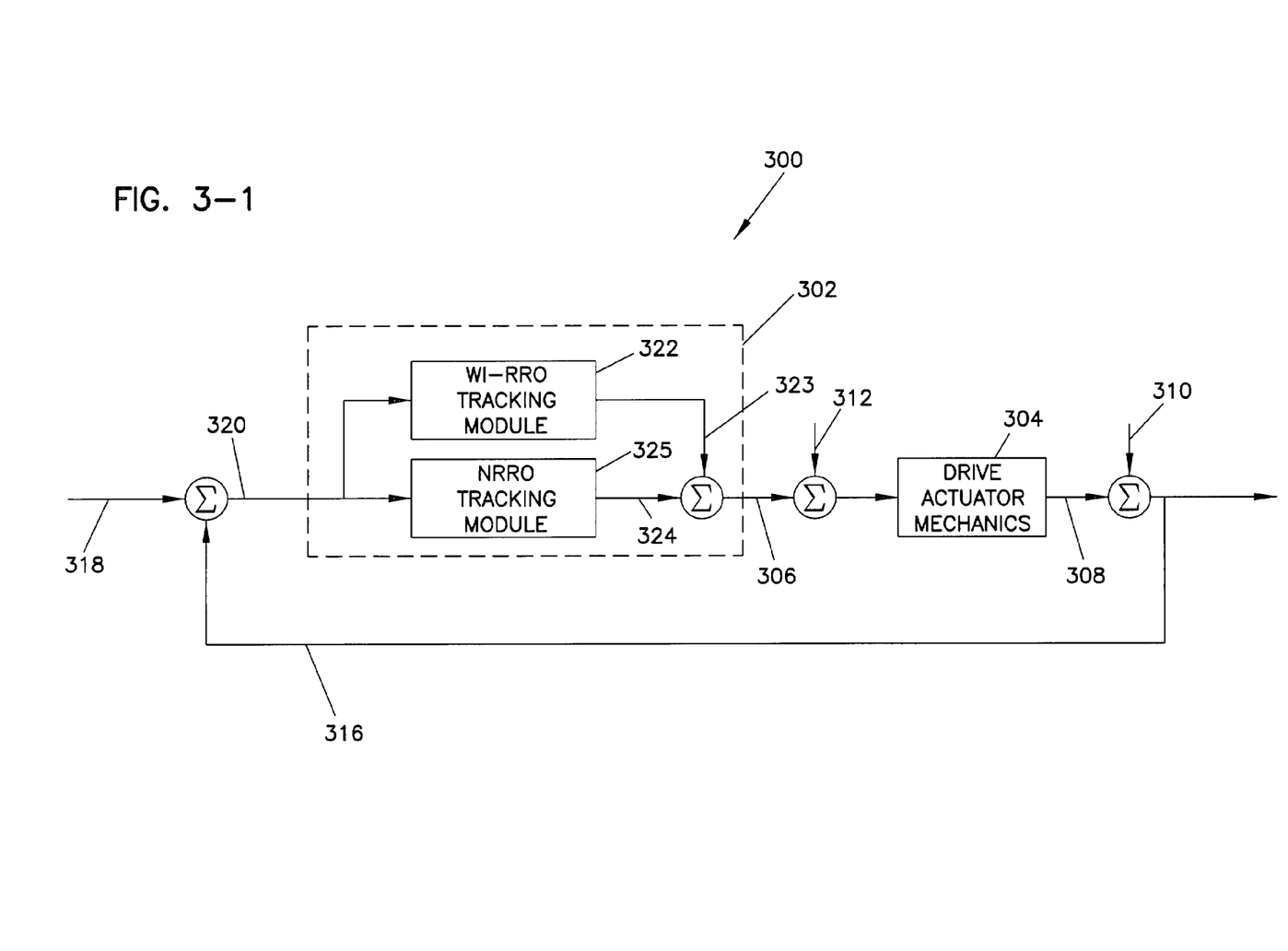

Referring now to FIG. 3-1, a block diagram of a servo loop 300 is shown. The servo loop 300 includes a servo controller 302 and disc drive actuator mechanics 304. Servo controller 302 is the servo controller circuitry within internal circuit 130 of FIG. 1. Drive actuator mechanics 304 includes actuator assembly 116, voice coil motor 118, track accessing arm 114, suspension 112 and sliders 110, all of FIG. 1.

Servo controller 302 generates a control current 306 that drives the voice coil motor of drive actuator 304. In response, the drive actuator 304 produces head motion 308. In FIG. 3-1, the RRO error is represented as a separate input signal 310 even though the RRO would otherwise appear implicitly in head motion 308. The separation of RRO from head motion 308 provides a better understanding of the present invention. In addition, noise in the servo system has been separated and appears as noise 312, which is added to the control signal. The sum of head motion 308, which includes noise 312, and RRO 310 results in the head's servo measurement signal, represented by reference numeral 316. Servo measurement signal 316 is subtracted from a reference signal 318, which is generated by internal circuitry 130 based on a desired location of the head. Subtracting head measurement 316 from reference signal 318 produces a position error signal (PES), represented by reference numeral 320, which is input to servo controller 302.

PES 320 includes an RRO error component and a non-repeatable run-out (NRRO) error component. As mentioned above, in drives including in-situ written discs, WI-RRO is caused by imperfectly written servo-tracks, and in drives including discs with pre-written servo tracks, additional RD-RRO occurs due to misalignment of the track center of the disc and the spindle-axis, and due to servo track distortion caused by disc clamping forces. NRRO is caused by spindle ball bearing defects, rocking modes, disc vibration, etc.

Figure 32:
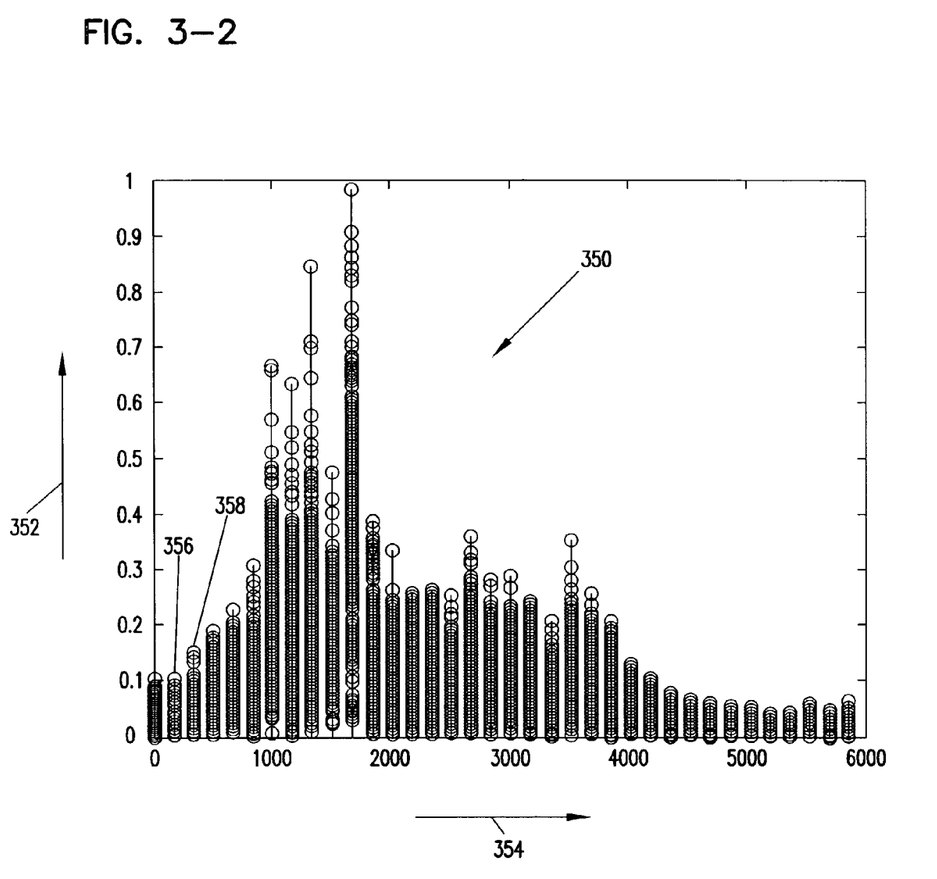
Figure 33:
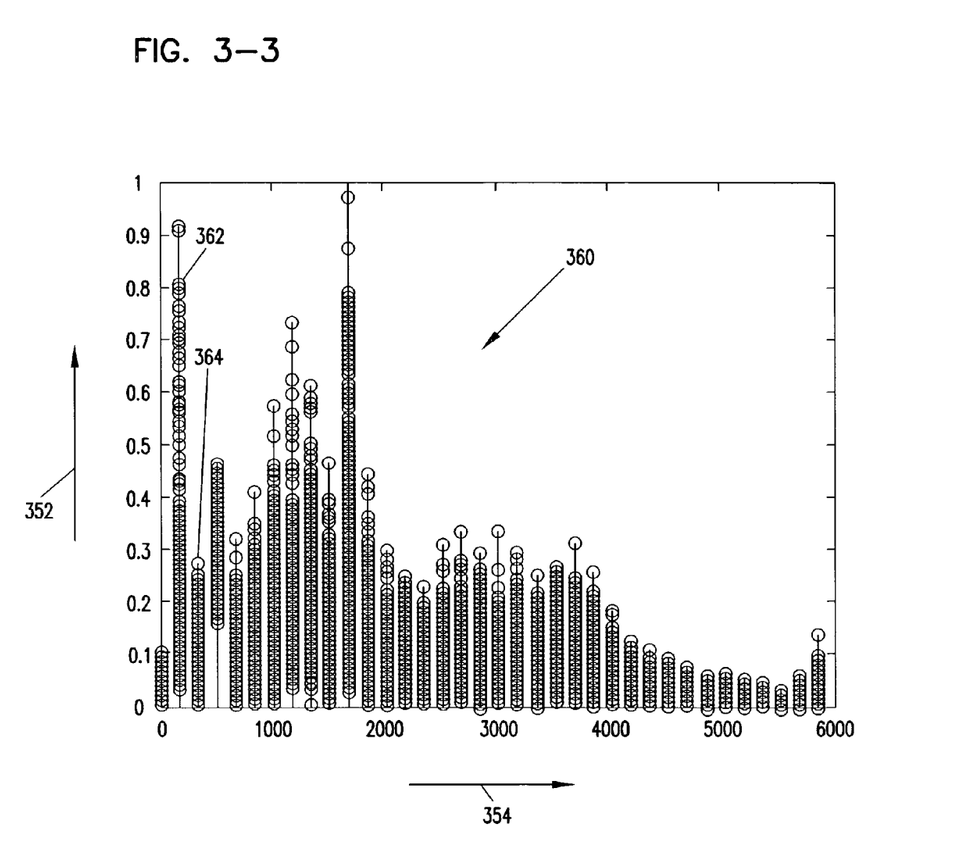

As can be seen in FIG. 3-1, servo controller 302 includes a WI-RRO tracking module 322 and an NRRO tracking module 324. WI-RRO tracking module 322 extracts the RRO component(s) from the PES and outputs an RRO control signal 323. Similarly, NRRO tracking module 324 extracts the NRRO component(s) from the PES and outputs an NRRO control signal 325. Control signals 323 and 325 are added to provide control signal 306. WI-RRO tracking module 322 is designed for use with drives that include discs with in-situ-written servo-tracks and does not function efficiently when employed in drives with discs that have pre-written servo tracks. An example feed-forward algorithm is employed in WI-RRO tracking module such as 322, and results obtained from seek/settle operations by employing such a WI-RRO tracking scheme in drives with in-situ-written discs and drives with pre-written discs are described below in connection with equations 1 through 3 and FIGS. 3-2 and 3-3.

RRO components from rotation of the spindle motor dominate at the first few harmonics of the spindle frequency. One feed-forward algorithm that produces an RRO control signal, $i_f$, used to track the $f^{th}$ spindle harmonic is generated as $$i_f = a_f(n)\sin(f \cdot \theta_k) + b_f(n)\cos(f \cdot \theta_k) \qquad \text{Equation 1}$$

where n is the index of the spindle rotation, and k is the index for the servo sector. Coefficients $a_f(n)$ and $b_f(n)$ are updated once per spindle rotation as $$a_f(n) = a_f(n-1) + g_f \sum_{k=0}^{N-1} \sin(f \cdot \theta_k) PES(k) \qquad \text{Equation 2}$$

and $$b_f(n) = b_f(n-1) + g_f \sum_{k=0}^{N-1} \cos(f \cdot \theta_k) PES(k) \qquad \text{Equation 3}$$

where N is the number of sectors, $g_f$ is the feedforward gain, and PES is the position error signal.

The algorithm described above, which implements Equations 1, 2 and 3, does not perform adequately in drives with large RD-RRO. This is illustrated by the plots shown in FIGS. 3-2 and 3-3. FIG. 3-2 shows RRO spectrum 350, with horizontal axis 354 indicating frequency in Hertz and vertical axis 352 indicating magnitude in microinches, collected on an in-situ-written drive, and FIG. 3-3 shows RRO spectrum 360 for a drive with pre-written discs (with large radially-dependent RRO). Both plots represent spectrums resulting from 200 random seeks. After each seek, the PES signal was collected over eight revolutions and the RRO was subsequently computed. In each drive, the algorithm described above was employed. The first harmonic component, 1f, represented by reference numeral 356 (FIG. 3-2) and second harmonic component, 2f, represented by reference numeral 358 (FIG. 3-2), which represent a substantial portion of the RD-RRO, are relatively small in the case of the drive with in-situ-written discs. However, the 1f and 2f harmonic components 362 and 364 (FIG. 3-3) are relatively large in the drive with prewritten discs, thereby demonstrating that the algorithm is unsuitable for such drives.

Figure 41:
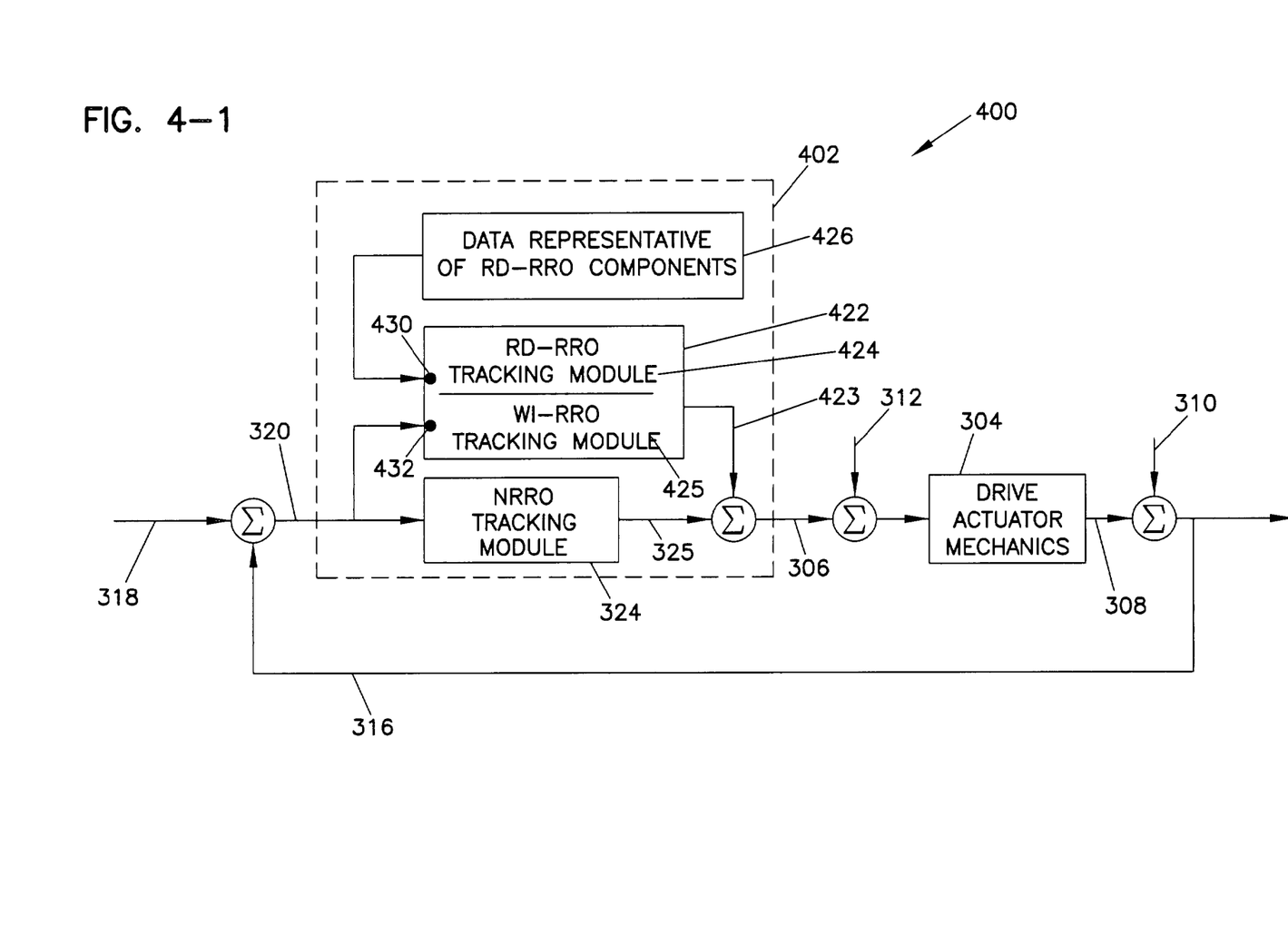

To obtain adequate performance in drives with large RD-RRO, the present invention includes an RRO tracking module that is capable of utilizing stored data representative of radially-dependent RRO to produce a suitable RRO control signal when the drive switches from track seek mode to track following mode. Referring now to FIG. 4-1, a block diagram of a servo loop of the present invention is shown. In FIG. 4-1, the elements common to FIG. 3-1 are numbered the same. Controller 402, of servo loop 400, is designed to track the relatively large RD-RRO in drives with pre-written discs.

As can be seen in FIG. 4-1, controller 402 includes RRO tracking module 422 and NRRO tracking module 324. RRO tracking module 422 includes a first input 432 for receiving PES 320 and a second input 430 capable of receiving data representative of RD-RRO components, represented by reference numeral 426. RRO tracking module 422 includes RD-RRO tracking module 424 and WI-RRO tracking module 425. Modules 424 and 425 may be integrated or separate. Data 426 is obtained either during factory calibration or start-up calibration of the drive. An example calibration procedure for obtaining data 426 is described further below. Data 426 may be stored in the form of a table in memory (for example, non-volatile memory) contained in servo electronics 130 (FIG. 1). Depending upon the particular track to be followed, RRO tracking module 422 selects a suitable data value from tracking data 426 and responsively produces an RRO control signal 423 of appropriate magnitude and phase for injection into the servo loop. Control signal 423 includes a RD-RRO signal component and a WI-RRO signal component. In one embodiment of the present invention, a suitable RD-RRO data value is selected at the beginning of a seek operation for a destination track so that the radially-dependent RRO can be tracked as soon as the head arrives at the destination track, thereby substantially reducing the settle time. In some embodiments, the RD-RRO components are determined and stored for a subset of the tracks on the disc (less than all of the tracks on the disc). If RD-RRO components are determined and stored for a subset of tracks and if no RD-RRO data is available in stored data 426 for a particular track to be followed, then RD-RRO data associated with a track closest to the track to be followed is utilized by tracking module 422. Each track of the subset of tracks for which RD-RRO components are determined are preferably spaced evenly apart between the ID and OD of the disc. In some embodiments of the present invention, data representative of RD-RRO components 426 is obtained and stored for only one track in each zone. The data for one track within a zone can be utilized for RD-RRO tracking of other tracks within the zone since the RD-RRO varies coherently across the surface of the disc from the OD to the ID. For example, referring to FIG. 2, RD-RRO data can be obtained only for track 202 in zone 214, for track 203 in zone 216 and for track 204 in zone 218 and utilized for tracking RD-RRO for all tracks on disc 200. NRRO tracking module 324 and the remaining elements of servo loop 400 are similar to the elements of servo loop 300. An example feed-forward algorithm employed in RRO tracking module 422 of the present invention is described below in connection with Equation 4 and FIG. 4-2.

Large radially-dependent RRO can be tracked by a feed forward algorithm described in Equation 4. Here, RRO control signal, $i_{f1}$, used to track the $f^{th}$ spindle harmonic is generated as $$i_{f1}=(A_f(\text{track\_id})+a_f(n))\sin(f\cdot\theta_k)+(B_f(\text{track\_id})+b_f(n))\cos(f\cdot\theta_k) \quad \text{Equation 4}$$

For this algorithm, terms $a_f(n)$ and $b_f(n)$ are updated in the same manner described in Equations 2 and 3, and $A_f(\text{track\_id})$ and $B_f(\text{track\_id})$ represent RD-RRO components or terms. Terms $A_f(\text{track\_id})$ and $B_f(\text{track\_id})$ can be implemented as a polynomial curve fit or a table-lookup scheme.

Figure 42:
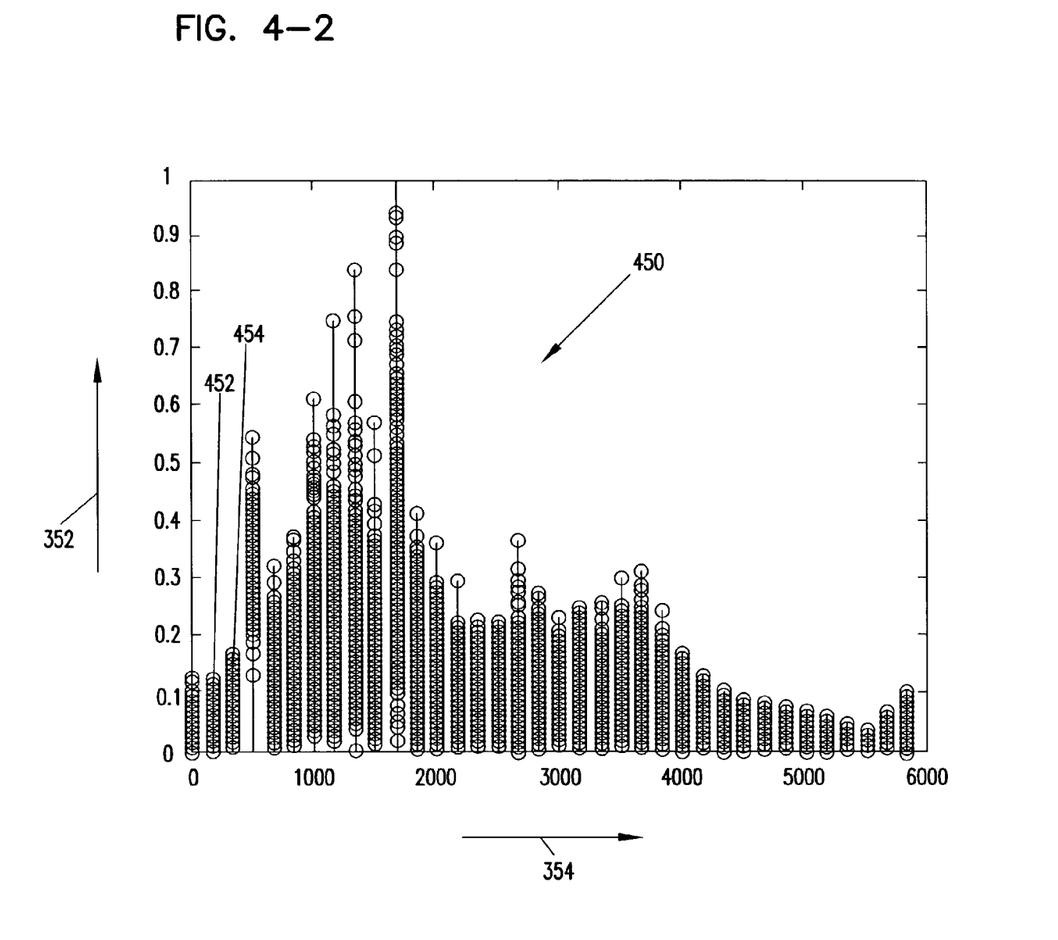
Figure 51:
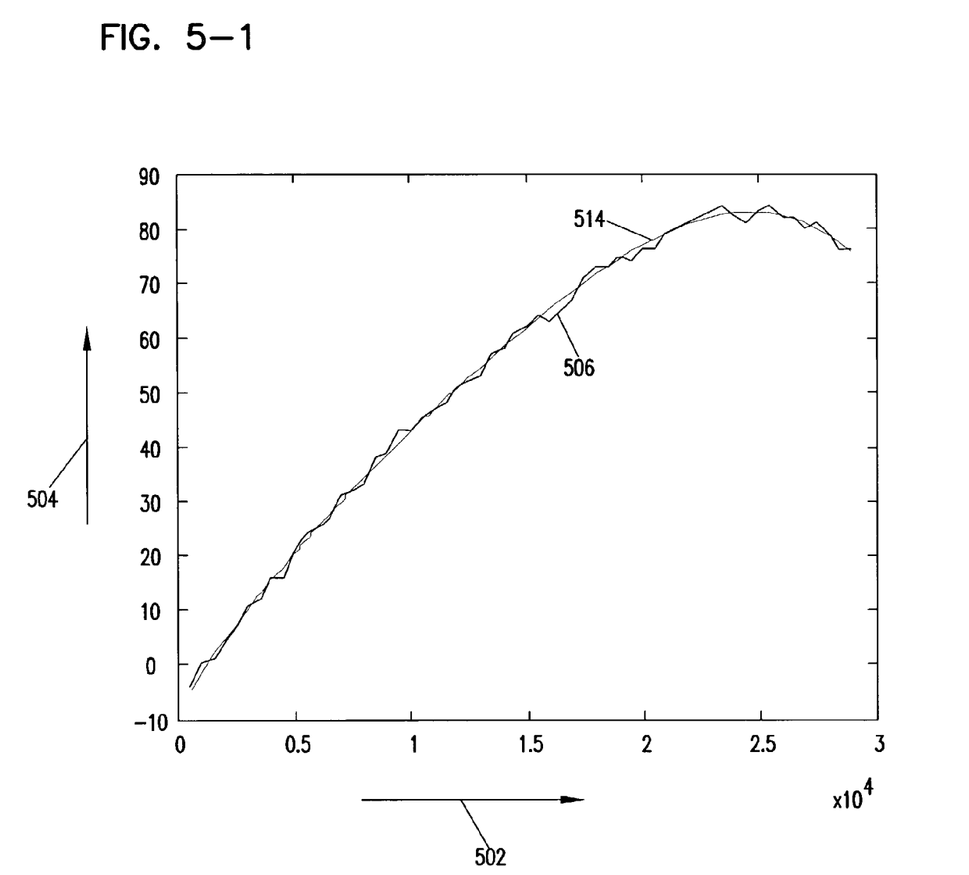
Figure 52:
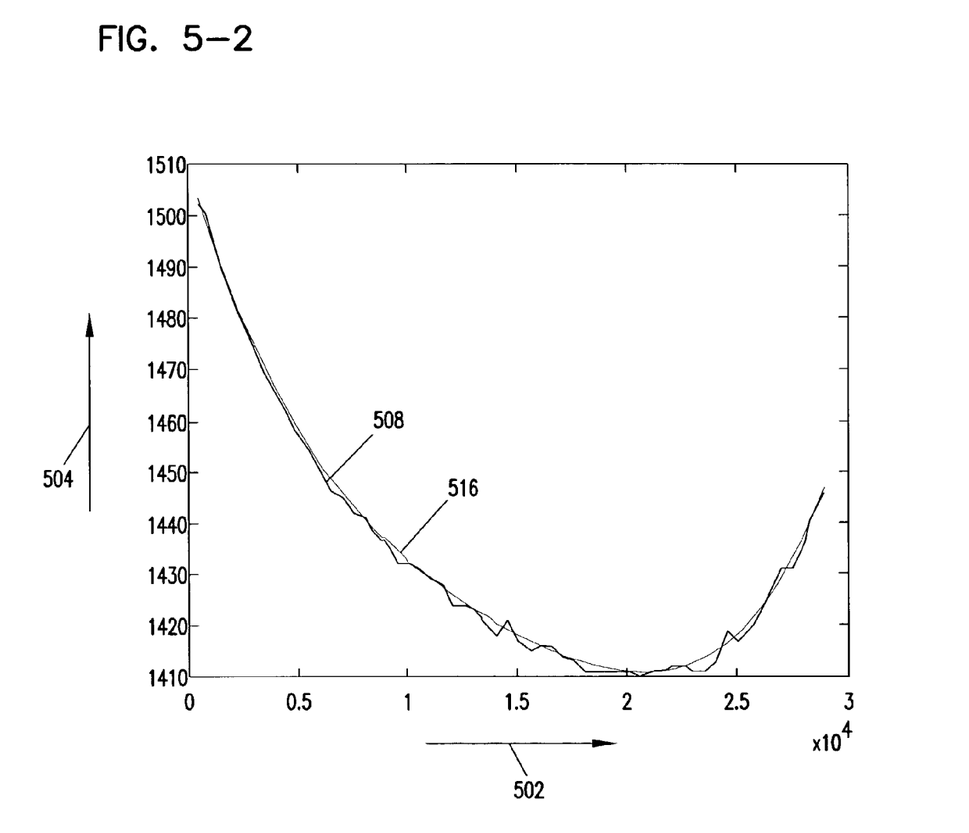
Figure 53:
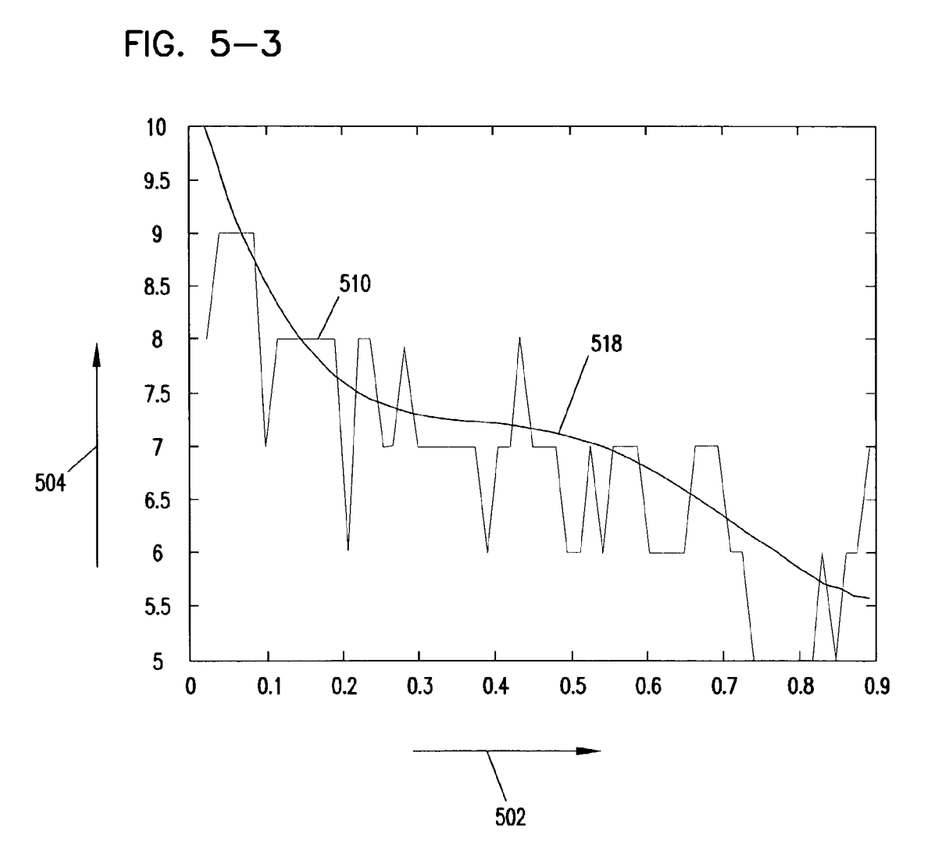
Figure 54:
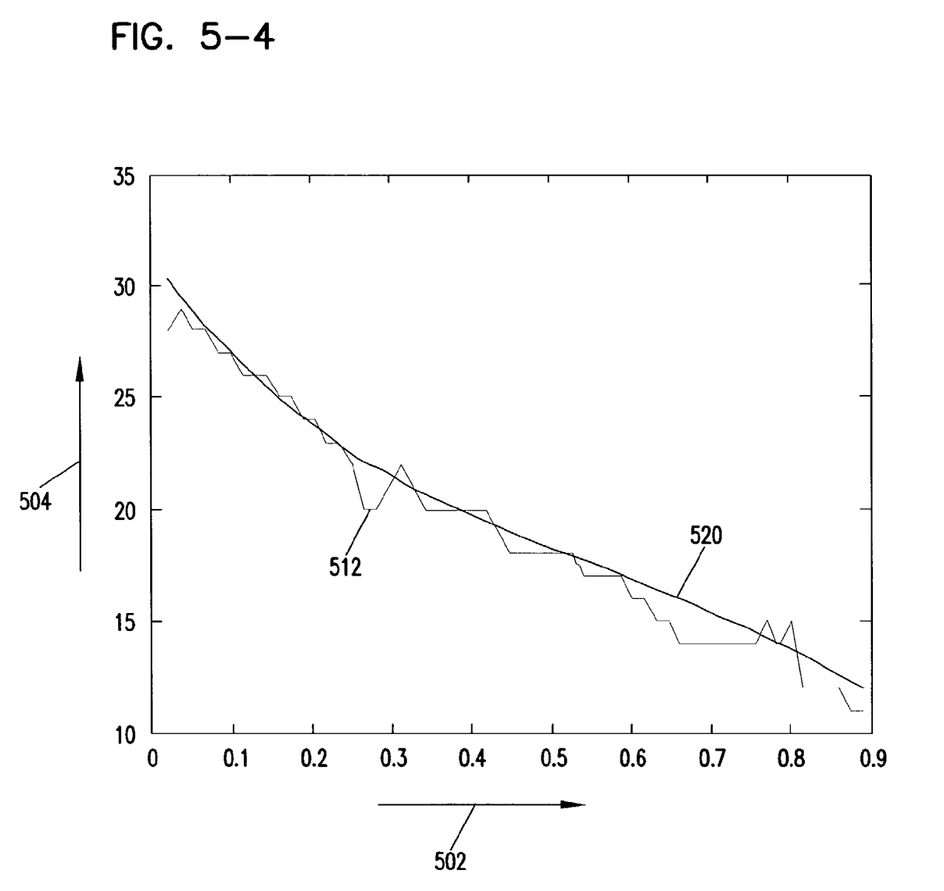

The algorithm described by Equation 4 was implemented in a drive built with pre-written discs to track large 1f (first harmonic) and 2f (second harmonic) RD-RRO components. The RRO spectrum 450 generated from 200 random seeks on this drive is shown in FIG. 4-2. The drive employed here is the same type of drive that was used to generate the data plotted in FIG. 3-3. Thus, the difference in tracking performance can be attributed to the use of the algorithm described by Equation 4. Comparing FIGS. 3-3 and 4-2, it can be seen that a substantial improvement in tracking the 1f and 2f components (reference numbers 452 and 454) resulted from using this algorithm. Also, comparing FIGS. 3-2 and 4-2, it can be seen that the level of tracking obtained using this algorithm is comparable to what was obtained in drives with in-situ-written discs.

In the above experimental implementation of the algorithm described by Equation 4, the procedure used to calibrate $A_f(\text{track\_id})$ and $B_f(\text{track\_id})$ involved the use of the algorithm described by Equations 1 through 3 to determine $a_f(n)$ and $b_f(n)$ during the calibration procedure. Steady-state values for $a_f(n)$ and $b_f(n)$ were read from 30 equally spaced tracks from OD to ID. FIGS. 5-1 through 5-4 illustrate plots for $a_f(n)$ and $b_f(n)$ for the first and second spindle harmonics, 1f and 2f. In FIGS. 5-1 through 5-4, horizontal axis 502 represents track identification number and vertical axis 504 represents scaled current. Plot 506 (FIG. 5-1) represents $a_1(n)$ ($a_f(n)$ for the first harmonic) and plot 508 (FIG. 5-2) represents $b_1(n)$ ($b_f(n)$ for the first harmonic). Similarly, plot 510 (FIG. 5-3) represents $a_2(n)$ ($a_f(n)$ for the second harmonic) and plot 512 (FIG. 5-4) represents $b_2(n)$ ($b_f(n)$ for the second harmonic). A fourth degree polynomial was fit to each of plots 506, 508, 510, and 512 was obtained and the resulting polynomials were used to determine $A_1(\text{track\_id})$ represented by plot 514 (FIG. 5-1), $B_1(\text{track\_id})$ represented by plot 516 (FIG. 5-2), $A_2(\text{track\_id})$ represented by plot 518 (FIG. 5-3) and $B_2(\text{track\_id})$ represented by plot 520 (FIG. 5-4).

A least-squares polynomial fit method for determining $A_f(\text{track\_id})$ and $B_f(\text{track\_id})$ is descried below in connection with Equations 5 through 11. The description of this method is limited to computing the coefficients for $A_1(\text{track\_id})$, but the method used to compute the coefficients for the other polynomials for $A_f(\text{track\_id})$ and $B_f$(track_id) is identical. Let the desired polynomial for $A_1$(track_id) be described as $$A_1(x) = c_0 + c_1 x + c_2 x^2 + \ldots + c_n x^n \quad \text{Equation 5}$$

where x in the normalized track ID computed as $$x = \text{track\_id/track\_normilization\_constant} \quad \text{Equation 6}$$

During a calibration process, the steady state values for $a_1(n)$ are read at m predetermined track locations, to form m ordered pairs $(x_i, y_i)$ where $$y_1 = a_1(n) @ x_1 \quad \text{Equation 7}$$

A least-squares solution for computing the polynomial coefficients can be computed as $$C = XY \quad \text{Equation 8}$$

where $$C = [c_0 c_1 c_2 c_3 c_4]' \quad \text{Equation 9}$$

$$X = \begin{bmatrix} k & \sum_{i=1}^{k} x_i & \sum_{i=1}^{k} x_i^2 & \cdots & \sum_{i=1}^{k} x_i^n \\ \sum_{i=1}^{k} x_i & \sum_{i=1}^{k} x_i^2 & \sum_{i=1}^{k} x_i^3 & \cdots & \sum_{i=1}^{k} x_i^{n+1} \\ \sum_{i=1}^{k} x_i^2 & \sum_{i=1}^{k} x_i^3 & \sum_{i=1}^{k} x_i^4 & \cdots & \sum_{i=1}^{k} x_i^{n+2} \\ \vdots & \vdots & \vdots & \ddots & \vdots \\ \sum_{i=1}^{k} x_i^n & \sum_{i=1}^{k} x_i^{n+1} & \sum_{i=1}^{k} x_i^{n+2} & \cdots & \sum_{i=1}^{k} x_i^{2n} \end{bmatrix}^{-1} \quad \text{Equation 10}$$

and $$Y = \left[ \sum_{i=1}^{k} y_i \quad \sum_{i=1}^{k} x_i y_i \quad \sum_{i=1}^{k} x_i^2 y_i \quad \cdots \quad \left( \sum_{i=1}^{k} x_i^4 y_i \right) \right]' \quad \text{Equation 11}$$

Since the x's contained within the matrix X in Equation 10 above are fixed predetermined values, the matrix X (Equation 10) can be computed offline and stored in memory. Further, matrix X (Equation 10) is common between all calculations for polynomials $A_f$(track_id) and $B_f$(track_id). Additionally, the matrix X (Equation 10) would be common for all drives within a drive platform. Thus, the least-squares polynomial fit method is adaptable and involves the storage of a relatively small amount of data. However, since this method involves the storage of only the polynomial coefficients, $A_f$(track-id) and $B_f$(track-id) have to be computed from the coefficients during seek operations. In contrast, in a table-lookup method, which involves the storage of a relatively large amount of data, the values for $A_f$(track-id) and $B_f$(track-id) are stored in a table in memory and are simply read before a seek operation. The values for $A_f$(track-id) and $B_f$(track-id) are steady state values of $a_f(n)$ and $b_f(n)$ determined for different tracks of the disc.

Data for the least-squares polynomial fit method or the table-lookup method can be obtained during a factory calibration procedure that is carried out during manufacture of the disc drive, a startup calibration procedure that is carried out during initial startup of the disc drive or a refined calibration procedure that is carried out subsequent to the initial startup of the disc drive.

Figure 6:
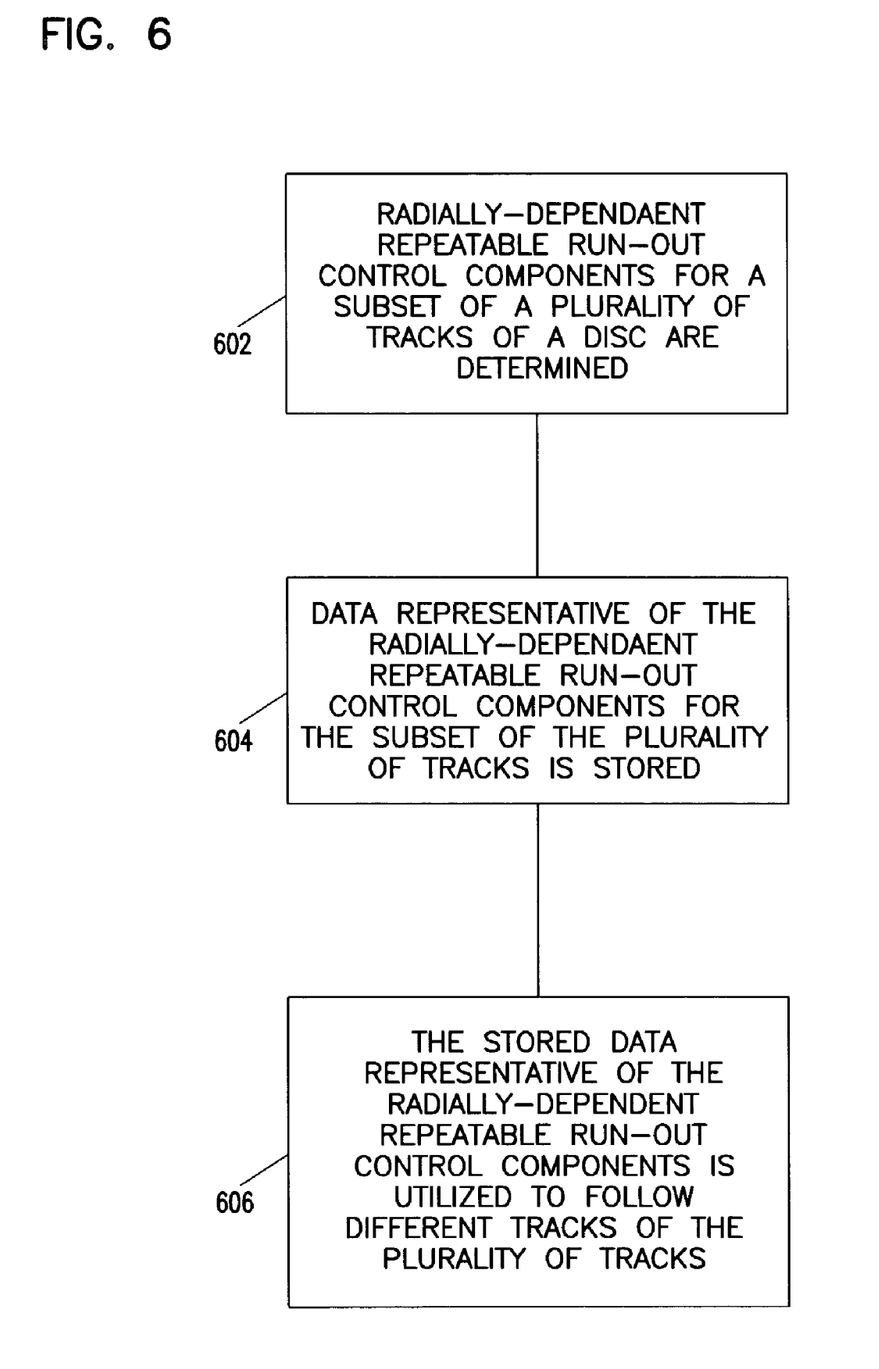
FIG. 6 is a flow chart representing a method of tracking RD-RRO in a disc drive in accordance with an embodiment of the present invention.

FIG. 6 is a flow chart representing a method of compensating for radially-dependent repeatable run-out in a disc drive having a servo loop for positioning a head over a rotating disc in accordance with an illustrative embodiment of the present invention. The rotating disc has multiple servo tracks. At step 602, radially-dependent repeatable run-out control components for a subset of a plurality of tracks of the disc are determined. At step 604, data representative of the radially-dependent repeatable run-out control components for the subset of the plurality of tracks is stored. At step 606, the stored data representative of the radially-dependent repeatable run-out control components is utilized to follow different tracks of the plurality of tracks. Different techniques, some of which are set forth above, can be employed to carry out the steps shown in the flow chart of FIG. 6 while maintaining substantially the same functionality without department from the scope and spirit of the present invention.

In summary, a method of compensating for radially-dependent repeatable run-out in a disc drive (such as 100) having a servo loop (such as 400) for positioning a head (such as 110) over a rotating disc (such as 200) is provided. The disc (such as 200) includes a plurality of tracks (such as 202, 203 and 204). Radially-dependent repeatable run-out control components for at least a subset of the plurality of tracks (such as 202, 203 and 204) are first determined. Data representative of the radially-dependent repeatable run-out control components (such as 426) is then stored. The stored data representative of the radially-dependent repeatable run-out control components (such as 426) is retrieved before settling on the target track, and subsequently used to follow the selected track (such as 202, 203 and 204).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a servo loop for a disc drive system, it will be appreciated by those skilled in the art that the teachings of the present invention can be applied to other systems, without departing from the scope and spirit of the present invention. Further, the radially-dependent RRO tracking scheme may be implemented in hardware or software. The disc drive can be based upon magnetic, optical, or other storage technologies and may or may not employ a flying slider.

What is claimed is:

1. A disc drive comprising:
   a disc mounted on a spindle motor, the disc having a plurality of tracks; and
   tracking means, in a servo loop, for tracking coherent repeatable run-out in the servo loop.

2. The apparatus of claim 1 wherein the tracking means comprises a repeatable run-out tracking module adapted to track coherent repeatable run-out in the servo loop by:
   (a) determining a coherent repeatable run-out control components for a subset of the plurality tracks;

(b) storing data representative of the coherent repeatable run-out control components for the subset of the plurality of tracks; and (c) utilizing the stored data representative of the coherent repeatable run-out control components to follow different tracks of the plurality of tracks.

3. The apparatus of claim 1 wherein the tracking means comprises a repeatable run-out tracking module adapted to track coherent repeatable run-out in the servo loop by:

(a) storing several repeatable run-out control components each determined from a plurality of tracks on the disc surface;

(b) receiving a command initiating a seek to a selected target track on the disc surface;

(c) before settling on the target track, retrieving the control components stored in the storing step (a); and (d) using the control components retrieved in the retrieving step (c) to follow the target track.

4. A method of tracking coherent repeatable run-out in a data storage system having a servo loop for positioning a head over a rotatable disc having tracks, the method comprising:

determining coherent repeatable run-out control components for at least a subset of the tracks;

utilizing data representative of the coherent repeatable run-out control components to follow the tracks; and storing data representative of the coherent repeatable run-out control components, wherein utilizing data representative of the coherent repeatable run-out control components comprises utilizing the stored data representative of the coherent repeatable run-out control components, and wherein storing data representative of the coherent repeatable run-out components comprises storing polynomial coefficients representing coherent repeatable run-out control components in a memory.

5. A method of tracking coherent repeatable run-out in a data storage system having a servo loop for positioning a head over a rotatable disc having tracks, the method comprising:

determining coherent repeatable run-out control components for at least a subset of the tracks;

utilizing data representative of the coherent repeatable run-out control components to follow the tracks; and storing data representative of the coherent repeatable run-out control components, wherein utilizing data representative of the coherent repeatable run-out control components comprises utilizing the stored data representative of the coherent repeatable run-out control components, and wherein utilizing the stored data representative of the coherent repeatable run-out components comprises:

reading data representative of a coherent repeatable run-out control component for a destination track to be followed from the stored data representative of the coherent repeatable run-out control components;

determining a coherent repeatable run-out control signal for following the destination track as a function of the data representative of the coherent repeatable run-out control component for the destination track; and injecting the coherent repeatable run-out control signal into, the servo loop to thereby position the head to follow the destination track, and wherein reading data representative of the coherent repeatable run-out control component for the destination track is carried out during a seek operation for the destination track just prior to positioning the head to follow the destination track.

6. The method of claim 5 wherein determining the coherent repeatable run-out control signal for following the destination track is carried out during the seek operation.

7. A method of tracking coherent repeatable run-out in a data storage system having a servo loop for positioning a head over a rotatable disc having tracks, the method comprising:

determining coherent repeatable run-out control components for at least a subset of the tracks; and utilizing data representative of the coherent repeatable run-out control components to follow the tracks;

wherein the coherent repeatable run-out control components are determined from a calibration procedure, and wherein the calibration procedure is a factory calibration procedure that is carried out during manufacture of the disc drive.

8. A data storage system comprising:

a servo loop for positioning a head over a rotatable disk having tracks, the servo loop comprising:

a repeatable run-out tracking module adapted to track coherent repeatable run-out in the servo loop by:

determining coherent repeatable run-out control components for at least a subset of the tracks; and utilizing data representative of the coherent repeatable run-out control components to follow the tracks, wherein the repeatable run-out tracking module is further adapted to utilize the stored data representative of the coherent repeatable run-out components by:

reading data representative of a coherent repeatable run-out control component for a destination track to be followed from the stored data representative of the coherent repeatable run-out control components;

determining a coherent repeatable run-out control signal for following the destination track as a function of the data representative of the coherent repeatable run-out control component for the destination track; and injecting the coherent repeatable run-out control signal into the servo loop to thereby position the head to follow the destination track, and wherein the repeatable run-out tracking module is further adapted to read the data representative of the coherent repeatable run-out control component for the destination track during a seek operation for the destination track just prior to positioning the head to follow the destination track.

9. A data storage system comprising:

a servo loop for positioning a head over a rotatable disk having tracks, the servo loop comprising:

a repeatable run-out tracking module adapted to track coherent repeatable run-out in the servo loop by:

determining coherent repeatable run-out control components for at least a subset of the tracks; and utilizing data representative of the coherent repeatable run-out control components to follow the tracks, wherein the repeatable run-out tracking module is further adapted to utilize the stored data representative of the coherent repeatable run-out components by:

reading data representative of a coherent repeatable run-out control component for a destination track to be followed from the stored data representative of the coherent repeatable run-out control components;

determining a coherent repeatable run-out control signal for following the destination track as a function of the data representative of the coherent repeatable run-out control component for the destination track; and injecting the coherent repeatable run-out. control signal into the servo loop to thereby position the head to follow the destination track, and wherein the repeatable run-out tracking module is further adapted to determine the coherent repeatable run-out control signal for following the destination track during the seek operation.

* * * * *